Patented May 22, 1934

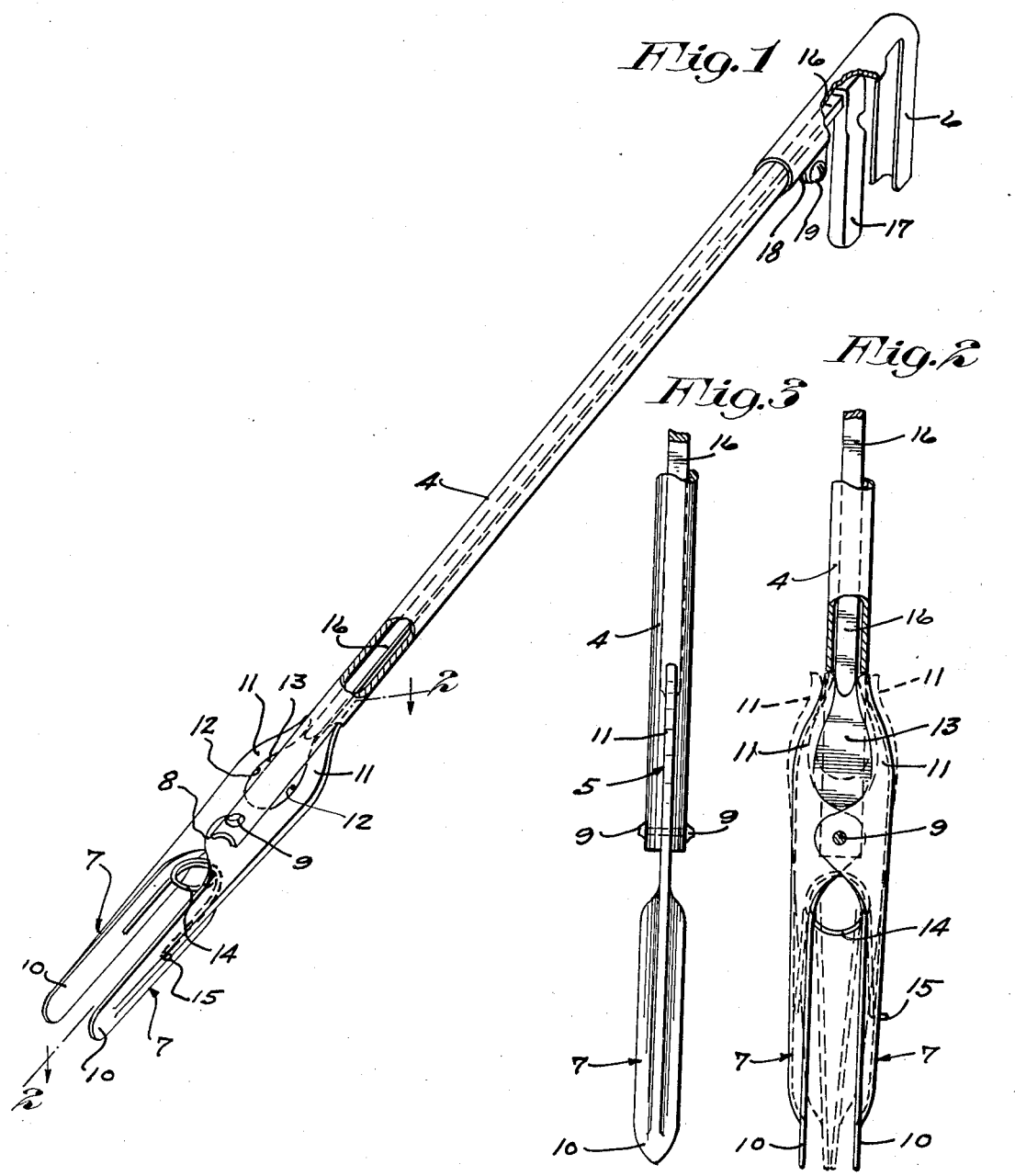

1,959,617

UNITED STATES PATENT OFFICE 1,959,617

DANDELION PULLER

Damjan Dragovich, Minneapolis, Minn., assignor to George Pirich, Minneapolis, Minn.

Application April 13, 1933, Serial No. 665,877

3 Claims. (Cl. 55—68)

My invention relates to an improved device for pulling dandelions and other obnoxious plants. As is well known, dandelions and certain other obnoxious plants which infest lawns and other cultivated plots, are perennials, and have long taproots which, if not completely or substantially completely removed from the ground, will grow a new plant the forthcoming season. In the past, it has proven very difficult to remove all or sufficient of the taproots of these plants from lawns to prevent further growth thereof without removing or damaging considerable sod surrounding the plant, and thereby damaging the lawn.

It is an object of this invention to provide a device, by means of which, dandelions including all, or sufficient of their taproots to be fatal to future growth thereof, may be quickly and easily removed from lawns, without removing the sod surrounding the plants or otherwise damaging the lawn.

Other objects of the invention are the provision of a simple, inexpensive, quickly assembled, easily operated and otherwise highly efficient device of the class described.

In the accompanying drawing, which illustrates the invention, like characters indicate like parts throughout the several views.

Referring to the drawing:

Fig. 1 is a perspective view of the complete apparatus with some parts broken away and some parts shown in section;

Fig. 2 is a fragmentary side elevation of the device with some parts sectioned in the vicinity of the line 2—2 of Fig. 1; and Fig. 3 is a fragmentary view illustrating the same portion of the device illustrated in Fig. 2, but with the parts rotated 90 degrees.

In the preferred arrangement illustrated, the main body of the device is in the nature of a tubular stem 4, bifurcated at its lower or outer end portion at 5 and provided at its upper or inner end portion with a rigidly but detachably secured handle 6. Opposed levers 7 having at their intermediate portions overlapping pivot lugs 8 are pivoted in the bifurcated end portion of the tubular stem on rivets or the like 9 passed through the overlapping pivot lugs 8. The intermediately pivoted levers 7 are formed to afford opposed outwardly extending relatively long gripping blades 10 and rearwardly extending shanks 11. The shanks 11 converge rearwardly and the free ends thereof normally extend into the uppermost portion of the space between the opposed portions of the bifurcated head. The rearwardly and inwardly converging opposed inner surfaces of the shanks 11 afford cam surfaces 12 that are acted upon by a two-faced cam 13, axially slidably mounted in the bifurcated end portion of the stem 4. The levers 7 are normally maintained in approximately parallel spaced relation by means of a coiled sear spring 14, mounted between the opposed levers 7 with the coiled portion thereof in close relation to the pivot 9 and the arms thereof extending outwardly and engaging one with each of the opposed gripping blades 10. Frictional contact may be relied upon to hold the sear spring 14 against movements from an operative position, but preferably the free end of at least one of the arms of the spring will be provided with an out-turned portion 15 that will work through a suitable aperture in its co-operating gripping blade 10.

Extending rearwardly from the cam 13 through the tubular stem 4 is an operating rod 16. This rod 16 extends completely through the tubular stem 4 and is provided beyond the upper or inner end of the tubular stem with an offset operating arm 17 that underlies and is normally spaced from the offset portion of the handle 6 and which arm 17 affords a finger grip. The handle 6, at its point of connection with the tubular stem, is in the form of a split tube provided with opposed clamping lugs 18 through which is passed a clamping screw 19. The split tubular portion of the handle is telescoped over the upper or inner end of the stem 4 and is tightly clamped thereto by means of the screw 19. Beyond the stem 4 the handle 6 is channel-shaped in cross-section to permit free movement of the inner end of the operating arm 17 therethrough.

It will be obvious that under the action of the spring 14, the levers 7 will be maintained in substantially parallel spaced relation, as indicated in Fig. 1 and by full lines in Fig. 2, in which position the opposed cam surfaces of the shanks of said levers will be maintained in engagement with or in very close relation to their respective co-operating surfaces of the cam 13 and that the gripping blades 10 will be closed toward one another when the cam 13 is moved upwardly, thereby spreading the shank portions of the levers apart against the action of the spring 14. The cam is automatically retracted to a normal position by the cam surfaces 12 of the shanks 11 which are maintained under considerable tension thereagainst by the spring 14.

The preferred method of pulling dandelions or the like by means of the device described, is as follows:

The gripping blades 10 are inserted into the soil, one on each side of the dandelion's taproot, as deep as possible. The gripping blades 10 are then closed toward one another as far as possible by upward pressure applied to the arm 17. If the blades 10 are fully extended into the ground, the lower ends thereof will be in quite close relation to the lower extremities of the taproot and under clamping action of the blades will be firmly gripped by the blades or in soil compressed between the blades. The device is now moved slightly in the ground with a sort of wobbling action, which will usually loosen the complete taproot. When the taproot is loose, the blades are vertically withdrawn and are applied to the upper portion of the taproot near the surface of the ground. The taproot, being loose, may now be readily pulled from the ground by gripping the upper portion of the taproot near the surface of the ground between the opposed blades and pulling upwardly on the same.

In the above manner, all or at least sufficient of the taproots to be fatal to future growth of the same may be quickly and easily removed from lawns without removing the sod surrounding the plant or otherwise appreciably marring the appearance of the lawn. The small slots cut in the sod by the blades will be hardly visible after the blades are removed and can usually be closed completely by stepping on the cut portion of the sod. In most instances, the taproot will be withdrawn as an entirety but even in cases where the taproot is broken off in the process of loosening, such breaks will occur below the projected ends of the gripping blades, and this is so far below the surface of the ground that the remainder of the root will smother.

What I claim is:

1. A device for pulling dandelions and the like comprising a tubular stem having a bifurcated end portion, opposed levers pivoted on a common axis in the bifurcated end portion of the stem, said levers affording relatively long outwardly extended gripping blades and relatively short rearwardly extended shanks having opposed rearwardly and inwardly converging cam surfaces, a two-faced cam working axially in the bifurcated end portion of the stem and engaging the said opposed cam surfaces, spring means normally maintaining the gripping blades in spaced approximately parallel relation and the shanks in engagement with the cam, and connections extending through the tubular stem for imparting axial movements to the cam, said cam-operating connections including a rod extending from the cam through the tubular stem and provided near the end of the stem with an offset operating arm.

2. A device for pulling dandelions and the like comprising a tubular stem having a bifurcated end portion, opposed levers pivoted on a common axis in the bifurcated end portion of the stem, said levers affording relatively long outwardly extended gripping blades and relatively short rearwardly extended shanks having opposed rearwardly and inwardly converging cam surfaces, a two-faced cam working axially in the bifurcated end portion of the stem and engaging the said opposed cam surfaces, spring means normally maintaining the gripping blades in spaced approximately parallel relation and the shanks in engagement with the cam, and connections extending through the tubular stem for imparting axial movements to the cam, said cam-operating connections including a rod extending from the cam through the tubular stem and provided near the end of the stem with an offset operating arm, and in further combination with an offset handle projecting from the rear end of the stem and overlying the said offset operating arm.

3. A device for pulling dandelions and the like comprising a tubular stem provided with a bifurcated portion at one end and with a laterally projecting arm at its other end, like levers pivoted in the bifurcated portion of said stem on a common axis, said levers being formed to afford outwardly extended opposed gripping blades and rearwarly extended shanks having opposed cam surfaces, a cam slidable axially in the bifurcated end portion of said stem and engaging the opposing cam surfaces of said shanks, a rod extended axially through said stem and connected to said cam for slidably actuating the same and a movable hand-piece connected to the outer end of said rod and projected laterally therefrom in close association to said fixed arm, said hand-piece and arm being adapted to be simultaneously gripped in one hand and said arm, when moved, serving to actuate said cam to close said blades.

DAMJAN DRAGOVICH.